United States Patent [19]

Sugarek

[11] Patent Number: 5,694,117
[45] Date of Patent: Dec. 2, 1997

[54] ALARM SYSTEM FOR RISING STEM VALVES

[76] Inventor: C. Alan Sugarek, 6605 Rowan La., Houston, Tex. 77074

[21] Appl. No.: 634,955

[22] Filed: Apr. 19, 1996

Related U.S. Application Data

[63] Continuation of Ser. No. 259,014, Jun. 13, 1994, abandoned.

[51] Int. Cl.$^6$ .................................................. G08B 21/00
[52] U.S. Cl. ........................... 340/626; 340/686; 137/67; 137/68.11; 137/68.18; 137/554; 137/557
[58] Field of Search ................................. 340/626, 686; 137/67, 68.11, 68.18, 554, 557

[56] References Cited

U.S. PATENT DOCUMENTS

| | | | |
|---|---|---|---|
| 3,441,925 | 4/1969 | White | 340/274 |
| 3,717,171 | 2/1973 | Fawkes | 137/552 |
| 3,896,280 | 7/1975 | Blake | 200/81.9 M |
| 4,133,288 | 1/1979 | Burgess | 137/553 |
| 4,183,467 | 1/1980 | Sheraton et al. | 137/554 |
| 4,198,030 | 4/1980 | Jackson et al. | 251/61.5 |
| 4,341,241 | 7/1982 | Baker | 137/554 |
| 4,342,988 | 8/1982 | Thompson | 340/679 |
| 4,625,758 | 12/1986 | Murray | 137/554 |
| 4,651,778 | 3/1987 | Pernat et al. | 137/489 |
| 4,978,947 | 12/1990 | Finnegan | 340/611 |
| 5,144,102 | 9/1992 | Buse | 137/554 |
| 5,156,185 | 10/1992 | Lester | 137/554 |
| 5,179,974 | 1/1993 | Taniguchi | 137/554 |

OTHER PUBLICATIONS

Parry, Cyril *Relief Systems Handbook*, 1992, pp. 9–33 & p. 136.
Zappe, R.W., *Valve Selection Handbook*, 3rd ed '91 pp. 159–169 pp. 282 & 283.

*Primary Examiner*—Jeffery Hofsass
*Assistant Examiner*—Julie Lieu
*Attorney, Agent, or Firm*—Liddell, Sapp, Zivley, Hill & LaBoon, L.L.P.

[57] ABSTRACT

An alarm system for a particular type of lifting seal type valve, such as those employed in pressure relief. The alarm system consists of a signal source, an alarm mechanism and a signal carrying conductor secured to a seated lifting seal valve in such a manner that valve actuation will disrupt the transmission, interrupting the signal and activating the alarm.

5 Claims, 1 Drawing Sheet

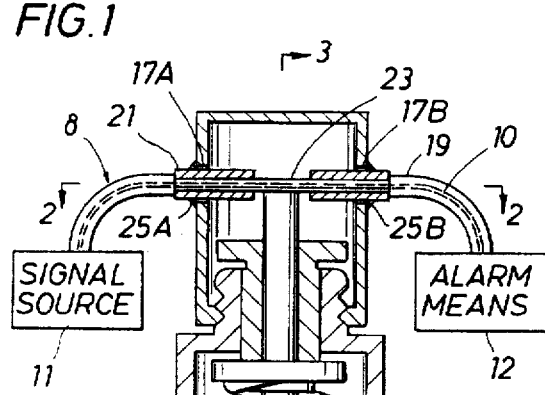
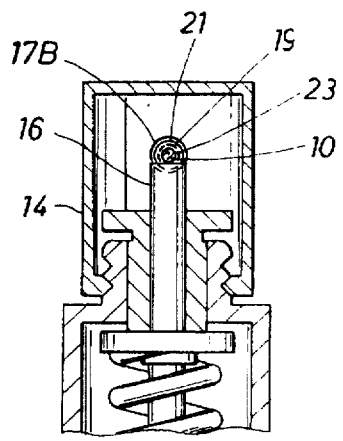
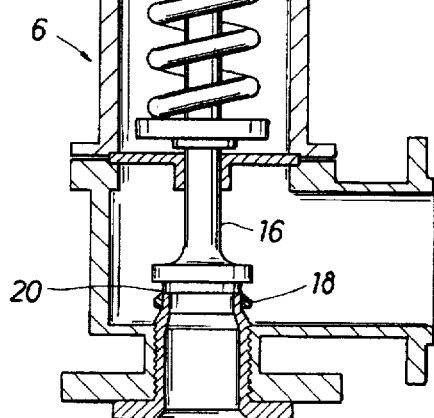
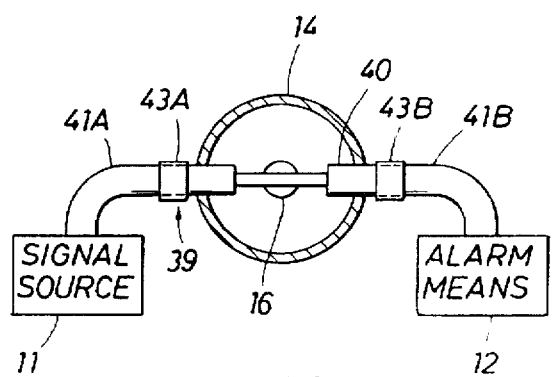
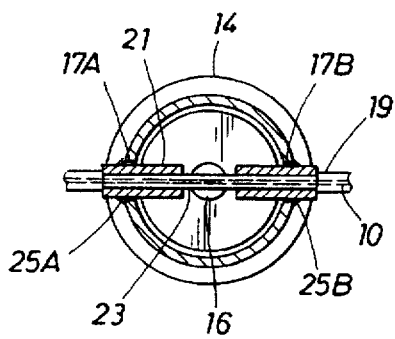
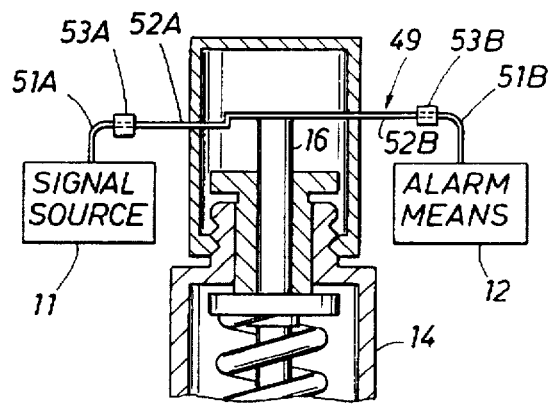

ALARM SYSTEM FOR RISING STEM VALVES

This is a continuation of application Ser No. 259,014 filed on Jun. 13, 1994 now abandoned.

FIELD OF THE INVENTION

This invention relates to an alarm system for lifting seal valves, particularly those used for pressure relief.

BACKGROUND OF THE INVENTION

Two types of devices are typically employed in providing safety relief for over and under pressurization of vessels, piping or other conduits or containers capable of transporting or storing a fluid: rupture discs and relief valves.

A rupture disc totally or partially bursts upon activation and is incapable of reseal. Hence, the fluid is free to vent from the time of rupture until corrective measures are taken, meanwhile operations are interrupted and costs incurred. Oftentimes the toxic, hazardous or contaminated fluids being released will create dire safety and/or environmental conditions. Furthermore, the upset may expose the unreleased fluid to contamination or instability since, after disc rupture, pressure cannot be maintained.

In order to minimize response time, inventors have created several alarm methods which involve a variety of triggering means, including switches, probes and sensors. An alternative alarm is illustrated in U.S. Pat. No. 4,342,988 to Thompson utilizing a frangible conductor attached to the disc which will break concurrently with disc rupture. U.S. Pat. No. 4,978,947 to Finnegan utilizes a similar rupture disc assembly, but differs in that the conductor is attached to a second disc or diaphragm located downstream of the primary disc and weaker in nature.

Reseating lifting seal type relief valves, with the ability to impose backpressure before, during and after relief, eliminate many of the shortcomings inherent in rupture discs. Oftentimes sensors and probes are also placed in the vent piping to detect emissions presence or flow, but these have proved costly and unreliable. Another alarm means, typically in the form of position indicators, have also been added to indicate valve actuation, though rarely specifically for pressure relief service. For example, U.S. Pat. No. 5,179,974 to Taniguchi illustrates a valve with an electromechanical position indicator. U.S. Pat. No. 4,198,030 to Byron and Caldwell illustrates an electromechanical position indicator for a lifting seal type valve. U.S. Pat. No. 5,156,185 to Lester is an example of an valve indicator with a switch that activates a signal at a preset position.

The position indicator devices illustrated in prior art are typically employed in pressure or flow control, but rarely in relief service. For relief service knowledge of stem position through the continuum from the seated to the fully open position is superfluous since only two positions are of primary concern—seated or unseated. Therefore, many of the elements can be eliminated, thereby providing a simpler, lighter, smaller and more reliable alarm system specifically for relief valve service, while reducing the costs of production, maintenance and support utilities.

Another shortcoming in the use of prior art position indicators for relief service is the false indication that is possible. After activation all the prior art indicators heretofore known are designed to indicate a reseated valve when the stem resumes the original position, thereby deactivating the alarm and inferring a nonflowing condition exists. This may be misleading since an improper reseat may have occurred, but undetectable with a position indicator. Reasons for improper reseat may include, but not limited to, the following: (a) washout at interface, (b) stem misalignment, (c) contaminants at interface, and (d) valve damage.

The purpose of a rupture disc alarm system, as illustrated in prior art, differs significantly from the purpose of a relief valve alarm system. Due to the inability of the disc to reseat after bursting, the primary purpose of the disc alarm system is a summons for action to restrict unabated venting. Furthermore, operations will be affected until the ruptured disc is replaced. Unlike the rupture disc, the relief valve is expected to automatically take the corrective action to control emission venting by reseating once the overpressure is bled off, with no change in operations. Without an alarm means it is not readily apparent valve actuation had transpired and, implicitly, that operations were disrupted, emissions were released and may continue to be released due to poor reseat or future upsets. Thus the purpose of the relief valve alarm is not a call for action, such as the case for a rupture disc, but provides process information that otherwise might go undetected, thereby alleviating a significant disadvantage of a reseating relief valve which is oftentimes the reason rupture discs are used in lieu of relief valves.

The primary purpose of the relief valve alarm system is to provide an inexpensive, functional, reliable means to indicate: an operation upset has occurred to actuate the valve; emissions were released with cost ramifications and possible safety or environmental impact; and the possibility exists that a satisfactory reseat may not have occurred, resulting in continual emission release.

SUMMARY OF THE INVENTION

An alarm system which is capable of unmistakably and continually providing a signal indicating the actuation of a lifting seal type valve, typical of relief valves.

The alarm system consists of a signal carrying conductor, signal source and alarm means. The conductor is secured to both the valve stationary housing and in touching relationship to a valve member comprising or attached to the seated lifting seal in such a manner that a movement at the seal/seat interface will interrupt the signal transmission, thereby activating the alarm which will remain activated regardless of subsequent seal positions.

Such an alarm system will provide a simple, reliable means to indicate valve actuation, emission release, and the possibility of continual release, due to improper valve reseat.

BRIEF DESCRIPTION OF THE DRAWINGS

FIG. 1 is a sectional side view of a basic lifting seal type relief valve incorporating an alarm system according to the present invention.

FIG. 2 is a cross-sectional view of the relief valve and alarm system taken along line 2—2 of FIG. 1.

FIG. 3 is a partial cross-sectional view of the relief valve and conductor taken along line 3—3 of FIG. 1.

FIG. 4 is a cross-sectional view of the relief valve taken along line 2—2 of FIG. 1 illustrating another conductor embodiment.

FIG. 5 is a partial sectional side view of a basic lifting seal type relief valve illustrating another conductor embodiment.

DETAILED DESCRIPTION OF THE PREFERRED EMBODIMENT

For purposes of description, the terms "lifting", "upward", "downward" and "rising", derivatives thereof, and other directional references relate to the invention as illustrated in FIG. 1. These designations are not to be considered limiting, but to serve as a basis for the claims and to represent the movement of one member relative to another. It is foreseen that the invention may assume various positions and orientations as valve structures or functioning parts dictate.

Referring now to the drawings in more detail, particularly to FIG. 1, reference numeral 6 illustrates a particular type of lifting seal type valve generally found in pressure relief service, comprising an alarm system 8, according to the present invention. Other members comprising the valve assembly 6 include: the housing 14, which is comprised of the stationary members, including the added stiffener 21 and the seat surface 20; and, the lifting seal member 16, comprising a seal surface 18 (For illustrative purposes the lifting seal member 16 is depicted as a single machined piece, rather than the more common assembly of machined pieces.). The lifting seal member 16 is designed to axially translate toward and away from the seat surface 20.

Normally the set force exerted downward on the lifting seal member 16 is sufficient to overcome fluid pressure upward on the end, hence blocking fluid flow. In order to relieve, the fluid force exceeds the set force, thereby lifting the seal surface 18 from the seat surface 20 and allowing fluids to pass. It is foreseen that the relief valve assembly 6 could employ various structures and arrangements within the art, but requires only one member, comprising the seal surface 18, which translates toward the seat surface 20 to block flow and away from the seat surface 20 to permit flow, and functions in cooperation with the alarm system 8.

The alarm system 8 comprises a signal carrying conductor 10 which transmits a signal from the signal source 11 to an alarm means 12.

The signal source 11 usually produces a continuous or oscillating signal, but the signal could consist of any form or nature which cooperates with the other components of the alarm system 8, including electrical, optical, sound, radio, short or long wave signals. For illustrative purposes two preferred signals, electrical and optical, are elaborated. For an electrical signal, the signal source 11, will provide a signal, A.C. or D.C., at a particular voltage and amperage that is deemed safe and compatible with the conductor 10 and alarm means 12, oftentimes requiring the transformation and/or rectification of the available supply. Though an electrical signal may be more convenient, the signal source 11 may produce an optical signal, particularly in areas where the presence of electricity is hazardous or otherwise prohibited. Selection of a preferred embodiment depends on a variety of factors including environment, available utilities, nature of fluid, purpose(s) and associated cost.

The alarm means 12 may comprise any suitable device to actively or passively receive the interrupted signal, transform, rectify and/or transmit the signal to achieve one or more prescribed results. This result may be the actuation of an alarm, indicator, safety equipment and/or the interaction with operations, such as switching off a compressor, activating a valve, or the like. Although conceivably the receiver of an optical signal may solely amplify the signal to make it perceptible, more often the receiver hardware, such as a photocell, will transform the signal to another energy form.

In FIG. 1 the conductor 10 is rigidly secured to either the valve housing 14 or the lifting seal member 16, preferably both, using a suitable means such as press fit, adhesives, clamps, fasteners, and other means, in such a manner that movement of one member relative to the other from the initial, or seated, position will break the conductor 10. For a light signal, FIG. 1 illustrates the conductor 10 as a thin optical fiber which is capable of transmitting light energy from the signal source 11 to the alarm means 12. Preferably, the conductor 10 is made of a brittle, frangible material, such as a glass, jacketed 19 to provide conduit and strength, and modified as needed, to minimize the force required to fracture the conductor upon the slightest movement of the seal surface 18 relative to the seat surface 20. One such modification is illustrated in the break area coating 23, where the cladding and jacketing have been reduced or eliminated. Various methods of support can also be added, one such method is exemplified with the addition of stiffener 21. This member 21 is comprised of rigid conduits, made of hard plastic, metal or the like, connected with ribs (for clarity, only illustrated in FIG. 2), and sized to snugly incase the conductor 10. The stiffener 21 penetrates the valve housing 14 through the added apertures 17A and 17B and is secured to the housing 14 to prohibit movement, using welds 25A and 25B, solder, adhesives or the like. One skilled in the art might employ these and various other techniques, particularly those which affect conductor composition, geometry, scoring and flaws for any frangible conductor embodiment to facilitate rupture.

Similarly for an electrical signal the conductor 10 is an electrically conductive filament of material such as copper, silver, gold, graphite, metal alloy or similar material. The insulation 19 is removed in the rupture area, where it is embedded in a thin, brittle frangible, nonconductive material 23 such as glass, porcelain, stone, ceramics, resinous synthetics and the like. This transpires in a manner to assure that the resultant acquires the brittle nature of the base material 23, and modified as needed, to facilitate fracture.

FIG. 4 illustrates another embodiment of a frangible conductor 39, which is comprised of two commercial conductive members 41A and 41B, suitable for economically routing the signal, a frangible member 40, and connectors 43A and 43B. For an electrical signal, the conductor 39 is composed of two insulated electrically conductive wires 41A and 41B and a brittle, frangible conductor 40, such the imbedded filament described previously, graphite, or a brittle insulator made conductive by metal plating, sputtering and the like, and joined by connectors. Likewise, for a light signal, two flexible fiber optics 41A and 41B and a section of specially fabricated frangible glass fiber 40 would be fused or otherwise connected together. Various techniques to increase frangibility could also be employed. This embodiment would facilitate installation, repair and interchangeable specialized parts.

FIG. 5 illustrates a non-frangible switch embodiment of the conductor 49, comprised of two commercial conductive members 51A and 51B, conductive contacts 52A and 52B, such as reed or leaf contacts, and connectors 53A and 53B. The contacts 52A and 52B are rigidly secured to and cantilevered from the stationary valve housing 14, with contact 52B biased to maintain a touching relationship with contact 52A and lifting seal member 16 in the seated position, and suitably elastic about the cantilever anchor to provide the hinge action characteristic of a switch. Various supports, stiffeners, contact designs, or the like, can be employed to more precisely influence actuation or amplify lever action, thereby amplifying translation of the lifting seal member 16. Preferably the jacketing or insulating material sealing contacts 52A and 52B does not hinder the sliding action at the interface between the contact 52B surface and lifting seal member 16. Various embodiments, requiring a minimum of one fixed contact and another contact incorporated or associated with the translating lifting seal member 16 or another member influenced by the lifting seal member 16, may be employed for electrical, optical or other signals. For an electrical signal, it is preferable that an expandable boot enclose the contacts to insure complete insulation. Likewise, for an light signal the fiber optic contacts could be modified to reduce losses at the contact interface.

Referring back to FIG. 1, in operation, the fluid force applied to the end of the lifting seal member 16 is sufficient to overcome the set force, thus separating the seal surface 18 from the seat surface 20. This movement is transmitted along the lifting seal member 16 to rupture the frangible signal carrying conductor 10, thereby interrupting the signal and activating the alarm 12. It is foreseen that there exist many methods to arrange or secure the conductor 10 to the lifting seal member 16 and/or housing 14 to insure that any movement at the seal/seat interface, translational or rotational, will result in conductor 10 rupture. The latter movement would transpire in the event sliding occurred at the interface rather than a separating, as designed.

Referring to FIG. 5, in operation the contacts 52A and 52B separate, going from a closed to open state, upon the slightest translation of the lifting seal member 16, thereby similarly interrupting the signal and activating the alarm 12. Through circuitry techniques employing relays, gates, or the like, the alarm means 12 is capable of remaining activated regardless of subsequent contact positions, including resumption of the original touching relationship. Another type of alarm system can be employed, which will activate and deactivate upon opening or closing the circuit, respectively. The latter alarm system would be notably beneficial for timing the duration of an overpressure release. Preferably, the alarm means 12 would combine both systems to provide a system which continually and unmistakably indicates if and when the valve has actuated, indicates the duration of release, and possibly also interacts with operations and/or activates safety equipment.

Utility, safety and cost considerations dictate conductor selection, placement and configurations. It is foreseen that many possible placements and configurations could be employed, which are not illustrated, to suit the various structures and arrangements of lifting seal type valves that are found in industry; in particular, anywhere upon, along, affixed or through the lifting seal member 16 or another member (not shown) attached or otherwise influenced by the lifting seal member 16. Similar options exist with the conductor relative to the valve housing 14 and members comprising said housing 14. Furthermore, the integrity of the valve assembly 6 does not necessarily need to be modified, since the conductor can be routed through an existing aperture, such as the valve inlet, outlet, or vent, and various support means can be employed that do not require altering the valve housing 14. One skilled in the art will be able to employ the invention in any such lifting seal valve structure.

It is to be understood that while certain embodiments of the present invention have been described and shown herein, it is not to be limited to the specific forms or arrangement of parts. Accordingly, the scope of the invention should be determined not by the embodiments illustrated, which are to serve as a basis for the claims, but by the appended claims and their legal equivalents.

What is claimed is:

1. An alarm system for a rising stem valve including a valve housing, a seat surface carried on the valve housing, a lifting seal member, a seal surface carried by the lifting seal member, a fluid passage extending through the seal surface and seat surface, the lifting seal member being moveable axially inside the valve housing from an open to a close position to move the seal surface toward or away from the seat surface, the system comprising:

a) a source for providing a signal;

b) a signal-carrying conductor which is frangible and mounted in touching relationship to both the lifting seal member and the valve housing, the conductor normally transmitting signal from the source, when unbroken, but rupturing upon movement and contact with the lifting seal member when the seal surface moves relative to the seat surface, thereby interrupting the signal; and, c) an alarm connected with the source and the conductor for detecting the transmitted signal and being activated by interruption of the transmitted signal.

2. The system according to claim 1 wherein the source a signal which is electrical.

3. The system according to claim 1 wherein the source provides a wave propagating signal.

4. A valve alarm system for monitoring pressure conditions in a fluid passage, comprising:

a) a pressure relief valve including a valve housing mounted in the fluid passage, a seat surface carried on the valve housing, a lifting seal member, a seal surface carried by the lifting seal member, the lifting seal member being moveable axially inside the valve housing from an open to a close position to move the seal surface toward or away from the seat surface and transmit fluid from the fluid passageway into the valve housing;

b) a source for providing a signal;

c) a signal-carrying conductor which is rigid and frangible and mounted in touching relationship to both the lifting seal member and the valve housing, the conductor normally transmitting signal from the source, when unbroken, but rupturing upon movement, and contact with the lifting member when the seal surface moves relative to the seat surface, thereby interrupting the signal; and d) an alarm connected to the source and the conductor to detect the transmitted signal and respond to the lack of a signal.

5. A valve alarm system for monitoring pressure conditions in a fluid passage, the system comprising:

a) a rising stem valve including a valve housing, a seat surface carried on the valve housing, a lifting seal member, a seal surface carried by the lifting seal member, the lifting seal member being moveable axially inside the valve housing upon pressure from the fluid in the fluid passageway to move the seal surface toward or away from the seat surface, the system comprising:

b) a source for providing an electrical signal;

c) a signal-carrying conductor which is frangible and rigid and is rigidly mounted to the valve housing across the path of movement of the lifting seal member and mounted in a touching relationship to both the lifting seal member and the valve housing, the conductor normally transmitting signal from the source, when unbroken, but rupturing upon axial movement of the lifting seal member when the lifting seal moves relative to the seat surface, thereby interrupting the signal.

\* \* \* \* \*